United States Patent
Griffin

(10) Patent No.: US 12,010,246 B2
(45) Date of Patent: Jun. 11, 2024

(54) SYSTEMS AND APPLICATIONS FOR SEMI-ANONYMOUS COMMUNICATION TAGGING

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/122,299

(22) Filed: Mar. 16, 2023

(65) Prior Publication Data

US 2023/0224168 A1  Jul. 13, 2023

Related U.S. Application Data

(63) Continuation of application No. 16/719,436, filed on Dec. 18, 2019, now Pat. No. 11,611,442, which is a continuation of application No. 16/719,045, filed on Dec. 18, 2019, now Pat. No. 11,265,176.

(51) Int. Cl.
*H04L 9/32* (2006.01)
*H04L 9/08* (2006.01)
*H04L 9/40* (2022.01)

(52) U.S. Cl.
CPC .......... *H04L 9/3255* (2013.01); *H04L 9/0825* (2013.01); *H04L 9/3263* (2013.01); *H04L 63/0421* (2013.01)

(58) Field of Classification Search
CPC ... H04L 9/3255; H04L 9/3263; H04L 9/0825; H04L 63/0421

USPC ........................................................ 713/156
See application file for complete search history.

(56) References Cited

U.S. PATENT DOCUMENTS

| | | | |
|---|---|---|---|
| 6,088,454 | A | 7/2000 | Nagashima et al. |
| 6,292,897 | B1 | 9/2001 | Gennaro et al. |
| 6,748,530 | B1 | 6/2004 | Aoki |
| 7,028,180 | B1 | 4/2006 | Aull et al. |
| 7,036,146 | B1 | 4/2006 | Goldsmith |

(Continued)

FOREIGN PATENT DOCUMENTS

| | | |
|---|---|---|
| WO | WO-2019/080933 A1 | 5/2019 |
| WO | WO-2019/138223 A1 | 7/2019 |

OTHER PUBLICATIONS

Agarwal et al., "A Survey of Group Signature Technique, its Application and Attacks", International Journal of Engineering and Innovative Technology, vol. 2, Issue 10, Apr. 2013. 8 pages.

(Continued)

*Primary Examiner* — Moeen Khan
(74) *Attorney, Agent, or Firm* — Foley & Lardner LLP

(57) ABSTRACT

Systems and applications are described that use group signature technology to allow for anonymous and/or semi-anonymous feedback while allowing for the application of rules and parameters. The use of group signature technology may serve to potentially mitigate or prevent malicious identification of individuals or entities providing a communication such as feedback. Feedback may range from constructive feedback all the way to the 'whistleblower' variety. It may be desirable to identify the individuals as belonging to a particular group or having a particular status or position while maintaining the anonymity of the individuals within the particular group.

20 Claims, 4 Drawing Sheets

(56) References Cited

U.S. PATENT DOCUMENTS

| | | |
|---|---|---|
| 7,234,059 B1 | 6/2007 | Beaver et al. |
| 7,346,171 B2 | 3/2008 | Numao et al. |
| 7,363,339 B2 | 4/2008 | Delany et al. |
| 7,472,277 B2 | 12/2008 | Halcrow et al. |
| 7,475,046 B1 | 1/2009 | Foley et al. |
| 7,533,270 B2 | 5/2009 | Gentry |
| 7,571,324 B2 | 8/2009 | Canard et al. |
| 7,904,722 B2 | 3/2011 | Sudia et al. |
| 8,117,230 B2 | 2/2012 | Shaji et al. |
| 8,245,047 B2 | 8/2012 | Zaccone et al. |
| 8,346,668 B2 | 1/2013 | Fujita |
| 8,397,291 B2 | 3/2013 | Miyazaki et al. |
| 8,522,040 B2 | 8/2013 | Camenisch et al. |
| 8,613,067 B2 | 12/2013 | Lambiase et al. |
| 8,650,403 B2 | 2/2014 | Canard et al. |
| 8,661,251 B2 | 2/2014 | Prouff et al. |
| 8,689,000 B2 | 4/2014 | Chen et al. |
| 8,838,984 B2 | 9/2014 | Aharonov et al. |
| 8,874,769 B2 | 10/2014 | Mao et al. |
| 8,977,661 B2 | 3/2015 | Cidon et al. |
| 9,015,231 B1 | 4/2015 | Hodgman et al. |
| 9,052,375 B2 | 6/2015 | Sampigethaya et al. |
| 9,325,694 B2 | 4/2016 | Du et al. |
| 9,860,069 B2 | 1/2018 | Patey et al. |
| 9,954,684 B2 * | 4/2018 | Popa .................. G06F 21/12 |
| 9,973,342 B2 | 5/2018 | Lyubashevsky et al. |
| 10,033,702 B2 | 7/2018 | Ford et al. |
| 10,225,258 B2 * | 3/2019 | Camenisch .......... H04L 63/126 |
| 2002/0007335 A1 | 1/2002 | Millard et al. |
| 2002/0156719 A1 | 10/2002 | Finebaum et al. |
| 2003/0195857 A1 | 10/2003 | Acquisti |
| 2003/0233542 A1 | 12/2003 | Benaloh |
| 2004/0078341 A1 | 4/2004 | Steichen |
| 2004/0128259 A1 | 7/2004 | Blakeley et al. |
| 2005/0038754 A1 | 2/2005 | Geist et al. |
| 2006/0184666 A1 | 8/2006 | Nozawa et al. |
| 2007/0104104 A1 | 5/2007 | Abu-Amara |
| 2007/0255661 A1 | 11/2007 | Yoshida et al. |
| 2008/0221945 A1 | 9/2008 | Pace et al. |
| 2009/0016317 A1 * | 1/2009 | Wu ...................... H04W 72/56 370/347 |
| 2009/0089575 A1 | 4/2009 | Yonezawa et al. |
| 2011/0078004 A1 | 3/2011 | Swanson, Sr. |
| 2012/0166808 A1 | 6/2012 | Hong et al. |
| 2013/0197967 A1 | 8/2013 | Pinto et al. |
| 2015/0074409 A1 | 3/2015 | Reid |
| 2015/0310115 A1 | 10/2015 | Ryger et al. |
| 2015/0339022 A1 | 11/2015 | Cardonha et al. |
| 2016/0261404 A1 | 9/2016 | Ford et al. |
| 2016/0330034 A1 | 11/2016 | Back et al. |
| 2016/0335629 A1 | 11/2016 | Scott |
| 2016/0358165 A1 | 12/2016 | Maxwell |
| 2017/0068499 A1 | 3/2017 | Xu et al. |
| 2017/0366358 A1 | 12/2017 | Lyubashevsky et al. |
| 2018/0006826 A1 | 1/2018 | Smith et al. |
| 2018/0173747 A1 | 6/2018 | Baird, III |
| 2018/0204191 A1 | 7/2018 | Wilson et al. |
| 2018/0343126 A1 | 11/2018 | Fallah |
| 2019/0028277 A1 | 1/2019 | Jayachandran et al. |
| 2019/0044700 A1 | 2/2019 | Leddy |
| 2019/0052470 A1 | 2/2019 | Park et al. |
| 2019/0080933 A1 | 3/2019 | Ishibashi |
| 2019/0087893 A1 | 3/2019 | Pellew |
| 2019/0114706 A1 | 4/2019 | Bell et al. |
| 2019/0132350 A1 | 5/2019 | Smith et al. |
| 2019/0260452 A1 | 8/2019 | Zhang et al. |
| 2019/0393993 A1 | 12/2019 | Su et al. |
| 2020/0322168 A1 | 10/2020 | Su et al. |
| 2020/0349616 A1 * | 11/2020 | El Kaafarani ..... G06Q 30/0282 |

OTHER PUBLICATIONS

Emura et al., "An r-Hiding Revocable Group Signature Scheme: Group Signatures with the Property of Hiding the Number of Revoked Users", Hindawi Publishing Corporation, Journal of Applied Mathematics, vol. 2014, Article ID 983040, Published Jun. 1, 2014. 15 pages.

Katurde et al., "Secured Group Data Sharing in Cloud Computing", International Journal of Advanced Computational Engineering and Networking, vol. 7, Issue 7, Jul. 2019. 3 pages.

Kumar et al., "A Novel Technique for Data Sharing and Forwarding Through Cost Effective Identity Concept", IJCSEST, Sep. 2016 Issue. 7 pages.

Leshkowitz, Maya, "Group Signature Schemes with Distributed Traceability (or how to open a signature fairly", Jun. 22, 2018. 7 pages.

Li et al., "Hidden attribute-based signatures without anonymity revocation", Information Sciences 180 (2010) 1681-1689.

* cited by examiner

SYSTEMS AND APPLICATIONS FOR SEMI-ANONYMOUS COMMUNICATION TAGGING

CROSS-REFERENCE TO RELATED PATENT APPLICATIONS

This application is a continuation of U.S. patent application Ser. No. 16/719,436, entitled "SYSTEMS AND APPLICATIONS FOR SEMI-ANONYMOUS COMMUNICATION TAGGING," filed Dec. 18, 2019, which is a continuation of U.S. Pat. No. 11,265,176, entitled "SYSTEMS AND APPLICATIONS TO PROVIDE ANONYMOUS FEEDBACK," filed Dec. 18, 2019, all of which are incorporated herein by reference in their entireties and for all purposes.

BACKGROUND

Anonymous communication or anonymous feedback may be useful in a number of situations that benefit from the ability of a person to send a message anonymously to another person or group. By ensuring sender privacy and confidentiality, anonymity reduces perceived risk and cost by the sender to providing the communication. Feedback such as from employees, team members about various critical topics, or from those in sensitive positions may be more forthcoming within a system where their identity safeguarded. There are many different types of digital signature schemes and each type has its own characteristics, usage benefits, and drawbacks. Some of these schemes can be described as anonymous digital signature schemes and examples may include signatures associated with X.509 digital certificates and the SignedData type defined in the Cryptographic Message Syntax (CMS) standards widely used by businesses (X9.73), in the IETF to implement secure electronic mail, or X.894 that standardizes CMS for the telecommunications industry. Though anonymous digital signatures are known, there is now a renewed interest in their application to new and emerging technologies.

SUMMARY

Systems and applications are described that leverage group signature technology to potentially mitigate or prevent malicious identification of individuals or entities providing a communication. In some implementations, the communication may be in the form of feedback. This may range from constructive feedback all the way to the 'whistleblower' variety. It may be desirable to identify the individuals as belonging to a particular group or having a particular status or position while maintaining the anonymity of the individuals within the particular group. For example, the feedback may be from an executive of a company. The receiver can verify that the feedback was sent by an executive of the company, but not the specific executive. This may be accomplished through the use of group signatures. Group signatures are anonymous digital signature mechanisms in which a relying party uses a single group public key to verify the digital signatures of all group members, while each group member has their own distinct, private signing key. The systems and applications may leverage group signature technology to protect the anonymity of the signer, the provider of feedback. While there is assurance that the information is coming from a member of the group using the group signature, there is no way for an outsider to verify which of the group members has signed the data signed by the group signature of the group.

In some implementations, systems and applications are described that leverage group signature technology to potentially mitigate or prevent malicious identification of individuals or entities providing a communication. It may be desirable to identify the individuals as belonging to a particular group or having a particular status or position while maintaining the anonymity of the individuals within the particular group.

In some implementations, the anonymous feedback environment solves a technical problem of maintaining anonymity of a user providing feedback or whistleblowing while still providing some assurances that the user providing feedback is a member of a group. The group membership may provide assurances that the user is in a position to have access to information for which the feedback pertains. In other situations, the group membership may provide assurances that the user has a certain level of trustworthiness because of membership in the group. Since the feedback is provided with a digital signature showing membership in a group, but does not necessarily identify which individual of the group has signed, some measure of privacy may be preserved. The group manager may be able to open a signature signed by a group member by showing which group member created it, where otherwise the signatures would be indistinguishable to those verifying the signature but would in some circumstances have to have rules and/or parameters applied. In other words, the group manager may have a secret master key which can be used to extract the identity of the group member from a given signature instance. This may provide the property of signer traceability, sometimes referred to as traceable signatures. Given a group signature instance, no one that is without possession of the secret master key held by the group manager can determine which group member was the signer. Without possession of the secret master key, the capability provides the property of signer anonymity. Similarly, in some implementations, the group manager may be able to link two signatures signed by the same signer where otherwise the signatures would be indistinguishable to those verifying the signature but would in some circumstances have to be audited or regulated.

Various implementations relate to a system including an anonymous feedback system. The system may comprise a network interface circuit and a membership circuit. The network interface circuit, in some implementations is configured to receive, from a server, a request comprising an indicator that the request comprises feedback, the request signed with a group signature. The membership circuit, in some implementations, is configured to determine a group membership of a sender of the request based on the group signature, apply one of a predetermined rule or parameter to the request based on the group membership, and accept and transmit feedback along with an indicator of the group membership of the sender based on application of the one of the predetermined rule or parameter.

In some implementations, the system further comprises an opening circuit configured to open an identity of the sender of the request. Application of one of the predetermined rule or parameter to the request based on the group membership may require using the opening circuit to open the identity of the sender of the request. In some implementations, the membership circuit is configured to use the identity of the sender of the request in application of the one of the predetermined rule or parameter, wherein accepting and transmitting feedback is further based on the use of the identity of the sender of the request in application of the one of the predetermined rule or parameter.

In some implementations, the system further comprises a linking circuit configured to link the signed request to a second signed request. Application of one of the predetermined rule or parameter to the request based on the group membership may require using the linking circuit to link the received request to the second signed request. In some implementations, the membership circuit is further configured to use the linking of the received request to the second signed request in application of the one of the predetermined rule or parameter, wherein accepting and transmitting feedback is further based on the use of the linking of the received request to the second signed request in application of the one of the predetermined rule or parameter.

Various other implementations relate to a method. The method may execute on an anonymous feedback system. The method may include receiving, from a server, a request comprising an indicator that the request comprises feedback, the request signed with a group signature, determining, using a membership circuit, a group membership of a sender of the request based on the group signature, applying one of a predetermined rule or parameter to the request based on the group membership, and accepting and transmitting feedback along with an indicator of the group membership of the sender based on application of the one of the predetermined rule or parameter. In some implementations, the method further comprises providing an interface to the anonymous feedback system to an entity to allow for individuals associated with the entity to transmit anonymous feedback using a group signature.

In some implementations, the method further comprises opening an identity of the sender of the request. Applying one of the predetermined rule or parameter to the request based on the group membership may require opening the identity of the sender of the request. In some implementations, the method further comprises using the identity of the sender of the request in applying the one of the predetermined rule or parameter, wherein accepting and transmitting feedback is further based on using the identity of the sender of the request in applying the one of the predetermined rule or parameter.

In some implementations, the method further comprises linking the signed request to a second signed request. Applying one of the predetermined rule or parameter to the request based on the group membership may require linking the received request to the second signed request. In some implementations, the method further comprises using the linking of the received request to the second signed request in applying of the one of the predetermined rule or parameter, wherein accepting and transmitting feedback is further based on using the linking of the received request to the second signed request in applying the one of the predetermined rule or parameter.

Other implementations relate to a system including a group signature tagging system. The system may comprise a network interface circuit and a membership circuit. The network interface circuit may be configured to receive, from an individual computing system, first data signed with a group signature. The membership circuit may be configured to determine at least one of (1) a group membership or (2) a status of a sender of the first data based on the group signature and tag and transmit second data with at least one of (1) the group membership or (2) the status of the sender of the first data. In some implementations, the second data is a group public key certificate and tagging the second data with at least one of (1) the group membership or (2) the status of the sender of the first data comprises issuing the group public key certificate comprising an indicator of at least one of (1) the group membership or (2) the status of the sender of the first data. In some implementations, the second data is a group public key certificate and tagging the second data with at least one of (1) the group membership or (2) the status of the sender of the first data comprises entering an indicator of the group membership or the status of the sender of the first data in a certificate extension of the group public key certificate. The system may further comprise, in some implementations, an opening circuit. The opening circuit may be configured to open an identity of a signer of the first data, wherein the identity of the signer of the first data is used to determine the at least one of (1) the group membership or (2) the status of the sender of the first data. The system may further comprise, in some implementations, a linking circuit. The linking circuit may be configured to link the received first data to a second received data, the second received data signed with the group signature. In some implementations, the status of the sender of the first data is a level in a corporate or governmental hierarchy. In some implementations, the group membership is associated with an identifier of a group.

Other implementations relate to a method executing on a group signature tagging system. The method may comprise receiving, from an individual computing system, first data signed with a group signature, determining, by a membership circuit, at least one of (1) a group membership or (2) a status of a sender of the first data based on the group signature, and tagging and transmitting second data with at least one of (1) the group membership or (2) the status of the sender of the first data. In some implementations, the second data is a group public key certificate and tagging the second data with at least one of (1) the group membership or (2) the status of the sender of the first data comprises issuing the group public key certificate comprising an indicator of at least one of (1) the group membership or (2) the status of the sender of the first data. In some implementations, the second data is a group public key certificate and tagging the second data with at least one of (1) the group membership or (2) the status of the sender of the first data comprises entering an indicator of the group membership or the status of the sender of the first data in a certificate extension of the group public key certificate. The method may further comprise, in some implementations, opening, by an opening circuit, an identity of a signer of the first data, wherein the identity of the signer of the first data is used to determine the at least one of (1) the group membership or (2) the status of the sender of the first data. The method may further comprise, in some implementations, linking, by a linking circuit, the signed first data to a second signed data signed with the group signature. In some implementations, the status of the sender of the first data is a level in a corporate or governmental hierarchy. In some implementations, the group membership is associated with an identifier of a group.

Other implementations relate to non-transitory computer-readable storage media storing instructions that are executable by one or more processors to perform operations including one or more of the above methods.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
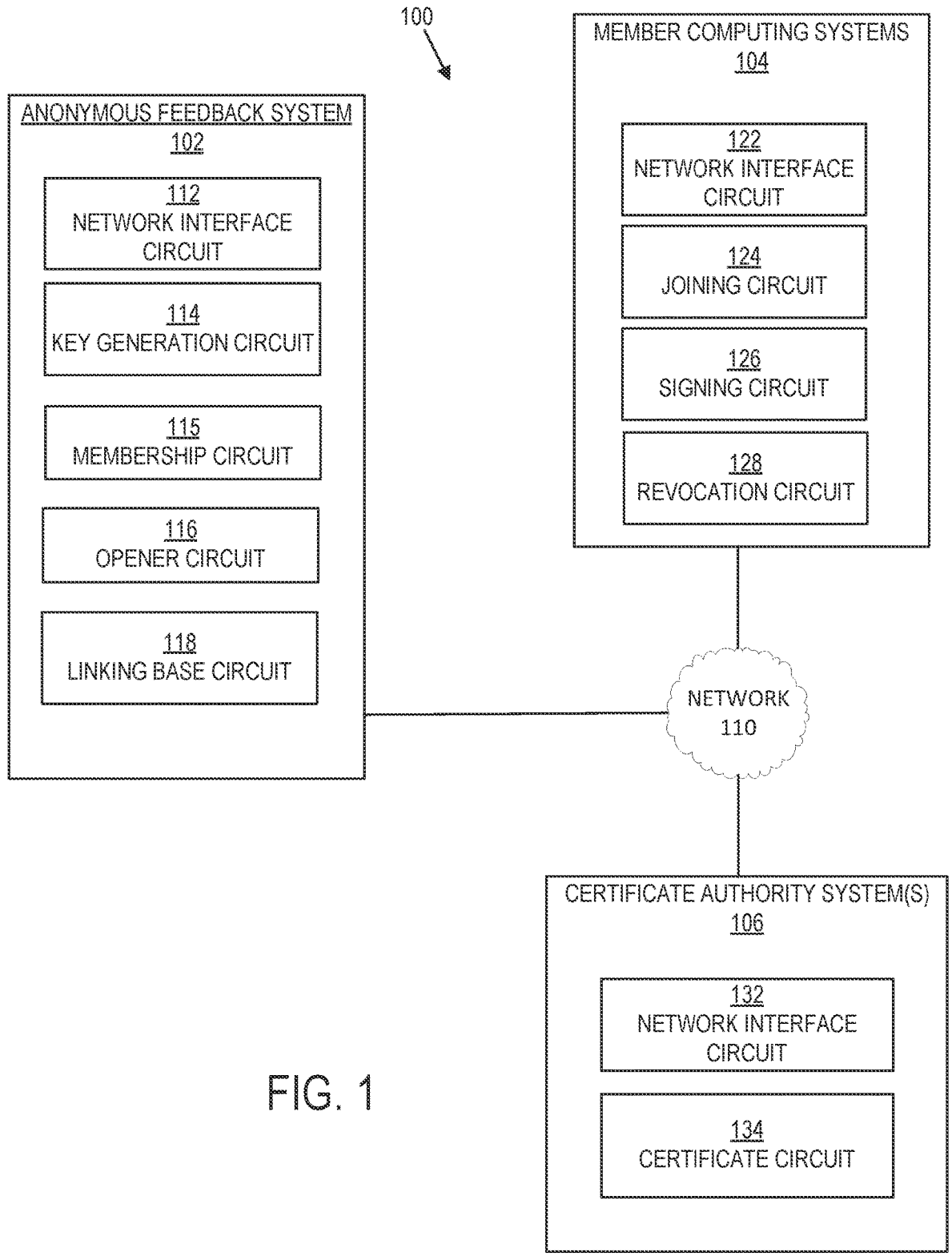
FIG. 1 is a schematic diagram of an anonymous feedback environment, according to an example implementation.

Systems and applications are provided that leverage group signature technology to allow for anonymous and/or semi-anonymous feedback while allowing for the application of rules and parameters. The use of group signature technology may serve to potentially mitigate or prevent malicious identification of individuals or entities providing a communication such as feedback. Feedback may range from constructive feedback all the way to the 'whistleblower' variety. It may be desirable to identify the individuals as belonging to a particular group or having a particular status or position while maintaining the anonymity of the individuals within the particular group. This may be accomplished through the use of group signatures. Group signatures are anonymous digital signature mechanisms in which a relying party uses a single group public key to verify the digital signatures of all group members, while each group member has their own distinct, private signing key. The systems and applications may leverage group signature technology to protect the anonymity of the feedback provider. While assurance is gained that the information is coming from a group member by using the group public key to verify a group member signature, there is no way for an outsider to verify which of the group members has provided the data signed by a member of the group. Group signatures allow for one group public key and a plurality of private keys, where each private key is associated with a group member. Signatures created by different group members are indistinguishable to verifiers but the group manager is able to determine which member has signed or to link member signatures. Anonymity of the group members may help mitigate or prevent any malicious identification and/or retaliation against those providing feedback. In some implementations a third party, for example the third party providing a company with the systems and/or applications needed to utilize anonymous feedback through group signature, is also a group manager. The group manager may have the capability of linking of two signatures by the same signer, the opening of a signature to reveal the identity of the signer, and revocation of group membership or certain capabilities in order to implement particular rules and/or parameters applied to feedback. The group manager may be a trusted third party such that a business can set parameters and rules for feedback but would not be able to break the anonymity of the signer without the third party. The group manager may be able to break the anonymity of the signer to the extent needed to apply the parameters and/or rules for feedback. This may be aided through the use of digital certificates. In some implementations, identification of a signer as belonging to a particular group or having a particular status or position is accomplished by adding an appropriate identifier in the group public key certificate. In some implementations, identification of a signer as belonging to a particular group or having a particular status or position is accomplished by unlocking a group member by the group manager.

Digital certificates are used by business and organizations to authenticate the identities of devices, employees, business partners, and regulators. Cryptographic keys associated with digital certificates may be used to sign ordinary email, create electronic signatures that comply with ESIGN and Uniform Electronic Transactions Act (UETA) requirements, sign transactions or smart contracts in blockchain and distributed ledger technology (DLT) environments, or enable entity authentication.

Group signatures are anonymous digital signature mechanisms in which a relying party uses a single group public key to verify the digital signatures of all group members, while each group member has their own distinct, private signing key. The present disclosure may relate to an extension of a group certificate that allows group users to conduct anonymous transactions in public, with the ability to subsequently audit and confirm signer identity. Further discussion of the group certificate extension may be found in application Ser. No. 16/429,629 which is incorporated herein in its entirety by reference. Auditing and confirmatory functions of the group manager may include group signature openers that are configured to reveal the identity of a signer that is a member of a group by their signature. Auditing and confirmatory functions of the group manager may also include group signature linkers that are configured to link two signatures (i.e., signed data) to the same signer using a linking key or linking base. In some implementations, regulators may contact the group manager through analysis of the group certificate extension for access to opening or linking functionality.

In some implementations, in an anonymous feedback environment each member of the group has a public and private key pair. The group manager may create the security parameters related to the group and may issue the group public key and work with each member of the group in the creation of their respective private key. The creation of each respective private key may be an iterative process with where each private key is created to work with an already generated group public key. The end result is each group member ends up with each group's own assigned private key paired with the one public key.

Referring to FIG. 1, a schematic diagram of an anonymous feedback environment 100 is shown, according to an example implementation. The system 100 comprises an anonymous feedback system 102, one or more member computing system(s) 104, one or more certificate authority system(s) 106, and a network 110. Each of the anonymous feedback system 102, one or more member computing system(s) 104, and certificate authority system(s) is in operative communication with one or more of the others via the network 110. The network 110 may include, for example, the Internet, cellular networks, proprietary banking networks, and the like.

Generally, the anonymous feedback system 102 is used to manage membership, privacy, key generation of a plurality of digitally signed data, and receipt of feedback. Although various implementations may be described in connection with example systems and methods, it should be understood that the systems and methods described herein may similarly be used to provide anonymous feedback in undescribed types of systems and methods, such as enterprise security and other types of systems. In some implementations, the anonymous feedback system 102 may also be configured to communicate with or function as a Certificate Authority (i.e., will also be configured to function as certificate authority system 106) to obtain and/or validate digital certificates or to issue and validate digital certificates. While the anonymous feedback system 102, one or more member computing system(s) 104, and one or more certificate authority system(s) 106 are shown as separate entities in FIG. 1, in some implementations a respective system may perform some or all of the functions of one of the other systems. For example, in some implementations, the anonymous feedback system 102 may perform some or all of the functions of the certificate authority system 106. In another example, the certificate authority system 106 may perform one or more of the functions of the anonymous feedback system 102. In some implementations, the member computing system 104 performs some of or all of the functions of the anonymous feedback system 102 (e.g., the functions of the key generation circuit 114).

The anonymous feedback system 102 includes a network interface circuit 112, a key generation circuit 114, a membership circuit 115, an opener circuit 116, and a linking base circuit 118. Generally, the anonymous feedback system 102 is structured to generate or facilitate generating group keys for signing data. The anonymous feedback system 102 may, for example, include one or more servers each with one or more processors configured to execute instructions stored in a memory, send and receive data stored in the memory, and perform other operations to implement use of anonymous feedback functions and related functions as described herein. The network interface circuit 112 is structured to facilitate operative communication between the anonymous feedback system 102 and other systems and devices over the network 110.

The anonymous feedback system 102 may comprise a key generation circuit 114. In some implementations, the key generation circuit 114 is configured to generate a public and private key pair, wherein the public key is the group public key. The key generation circuit 114 may also be configured to enroll members in the group. Enrolling members may including deriving and/or helping to derive their respective private key. In some implementations, the creation of each respective private key may be an iterative process where each private key is created to work with the already generated group public key. The end result is each group member ends up with their own assigned private key paired with the one group public key. Each respective private key is derived to work with established security parameters set by the group manager and the issued public group certificate.

The anonymous feedback system 102 may comprise a membership circuit 115. In some implementations, the membership circuit 115 is configured to receive and generate communication to, including feedback, (e.g., by using network interface 112) to a member of a group (e.g., to a member computing system 104). In some implementations, membership circuit 115 is configured to determine when feedback is received and a further determination made whether the feedback is properly formatted and signed. The feedback may be signed with a private signature and accompanied by a digital certificate indicating membership in a group. The feedback may be signed with a private key and sent with a public key allowing for verification that the signer belongs to a group. The feedback may also be accompanied by information regarding which group the sender belongs to. In some implementations, membership circuit 115 is further configured to verify that the signature associated with the feedback matches the information regarding which group the sender belongs to. In some implementations, membership circuit 115 is configured to verify a digital certificate associated with the signature.

In some implementations, the membership circuit 115 is configured to determine if any rules or parameters should be applied to the received feedback. In some implementations, the rules or parameters to be applied, if any, are determined by parameters associated with the group or the type of group associated with the group signature used to sign the feedback. In some implementations, application of the rules or parameters may require opening the identity of the signer of the feedback. In some implementations, application of the rules or parameters may require linking the signed feedback with other received signed feedback. For example, the group manager as part of or using the anonymous feedback system 102 may be a trusted entity with the capability of opening (e.g., by using opener circuit 116) and/or linking (e.g., using linking base circuit 118) the signed feedback in order to apply any relevant rules or parameters. In one non-limiting example of a rule or parameter to be applied, there may be a rule limiting the quantity of feedback to be sent during a given time period. A parameter of the quantity of feedback to be permitted is set and the rule applies that parameter to the number of feedback receipts of an individual member of a group. Application of the rules or parameters may not require opening the identity of the sender of the feedback, but instead require linking the received feedback to other received feedback to determine whether the parameter has been met. In another example of a rule or parameter to be applied, there may be a time period and/or time limit set for receiving feedback from particular group members. Application of the rules or parameters to limit feedback to a pre-determined time period or for a pre-determined time limit would not require either opening the identity of the signer or linking the signed feedback to other received feedback. In another example, the content of the feedback may be analyzed and the application of a rule or parameter is dependent on the content of the feedback. Certain formatting may be required for certain types of feedback and the feedback is not passed on if the formatting is incorrect. The certain formatting may be dependent on which group the signer is a member with different formatting requirements for different groups. Other implementations and combinations for applying rules and parameters are possible depending on which group the signer is a member of, information contained in the feedback, a requirement to open and/or link signer identity, and/or other factors associated with receiving the signed feedback signed with a group signature.

In some implementations, the membership circuit 115 is configured to analyze if a determination is that application of the rules and/or parameters requires opening the received, signed feedback. In some implementations, the group manager must be a trusted party in order to be given the capability of opening the received, signed feedback. In some implementations, the group manager must be a trusted $3^{rd}$ party in order to be given the capability of opening the received, signed feedback and separate from any business or other organization using the anonymous feedback environment (e.g., anonymous feedback environment 100). In some implementations other conditions must first be met in order to open the received, signed feedback. Conditions may include, the feedback has been received by the appropriate anonymous feedback system (e.g., anonymous feedback system 102), the feedback has been correctly signed using a group signature, and/or the feedback meets any required formatting requirements.

In some implementations, the membership circuit 115 is configured to open an identity of a signer of feedback (e.g., by using opener circuit 116). In some implementations, a group manager of the anonymous feedback environment (e.g., using anonymous feedback environment 100) has the ability to open a signature signed by a group member by identifying the member of the group that signed the feedback. While signatures that are created by different group members are indistinguishable to a verifier of the digital signature, they are not indistinguishable to the group manager (e.g., a group manager using anonymous feedback system 102 and the opener circuit 116) who may be able to disclose the identity of any member of the group. In some implementations, opener circuit 116 is configured to use a secret master key associated with the group that can be used to extract the identity of the signing group member. This capability provides the property of signer traceability, in what is are sometimes referred to as 'traceable signatures.' No one that is without possession of the secret master key (e.g., a secret master key held by a group manager) should be able to determine which group member was the signer. This capability provides the property of signer anonymity, where the larger the size of the group, the more anonymity for each group member is provided. In some implementations, the individual signatures of the group members may be a type of traceable signature, where the signature of a single member of the group may be traced without opening signatures or revealing identities of any other member of the group. In some implementations, a group manager of the anonymous feedback environment (e.g., anonymous feedback environment 100) has the ability to link a signature signed by a group member to other received, signed feedback. While signatures that are created by different group members are indistinguishable to a verifier of the digital signature, a linking base circuit (e.g., linking base circuit 118) may be configure to link different signatures together to identify a plurality of feedback that is linked to the same member of a group without revealing the identity of the group member.

In some implementations, the membership circuit is configured to accept the feedback given appropriate conditions and parameters have been met. In some implementations, the membership circuit 115 is configured to transmit the feedback to the proper recipient upon acceptance of the feedback. The feedback may be accompanied by the group the sender of the feedback is a member of.

The anonymous feedback system 102 may comprise an opener circuit 116. In some implementations, the opener circuit 116 is configured to open a signature signed using a group signature by identifying the member of the group that signed the data. While signatures that are created by different group members are indistinguishable to a verifier of the digital signature, they are not indistinguishable to a computer system controlled by a group manager who can disclose the identity of any member of the group. In some implementations, the anonymous feedback system 102 is configured with a secret master key that can be used to extract the identity of the signing group member. This capability provides the property of signer traceability, in what is are sometimes referred to as 'traceable signatures.' No computing system that is not configured to use the secret master key (e.g., an anonymous feedback system 102 configured with a secret master key) should be able to determine which group member was the signer. This computing system capability provides the property of signer anonymity, where the larger the size of the group, the more anonymity for each group member is provided. In some implementations, the individual signatures of the group members may be a type of traceable signature, where the signature of a single member of the group may be traced without opening signatures or revealing identifies of any other member of the group.

The anonymous feedback system 102 may comprise a linking base circuit 118. In some implementations, the linking base circuit 118 is configured to link two or more received signatures as being signed by the same group member without revealing the identity of the group member. The two or more signatures may be linked using a linking key or linking base. The linking base circuit 118 may further be configured to execute a linking process that is able to take two valid, linkable signatures signed using a group signature scheme and determine if they are linked. In other words, that they have been signed by the same member of the group. In some implementations, linking outputs a value of '1' if the signatures are linked and a value of '0' if the signatures are not linked.

The member computing system 104 may include a network interface circuit 122, a joining circuit 124, a signing circuit 126, and a revocation circuit 128. Generally, the member computing system 104 structured to help create private keys for joining a group and sign data. The member computing system 104 may, for example, include one or more processors configured to execute instructions stored in a memory, send and receive data stored in the memory, and perform other operations as part of an anonymous feedback environment 100. The network interface circuit 122 is structured to facilitate operative communication between the member computing system 104 and other systems and devices over the network 110.

The member computing system 104 may comprise a joining circuit 124. In some implementations, the joining circuit 124 is configured to join a new member using the member computing system 104 to a group by deriving a respective private key for the new group member that is associated with the extant public group key. Further, the joining circuit 124 may be configured to join the group members by deriving a respective private key. The joining circuit 124 may be configured to execute a joining portion of an iterative process where the respective private key for the newly joining group member is created by sending a random number by the joining circuit 124 to a system that determines whether the private key thus created will work with the already generated group public key. The joining circuit 124 may thus be configured such that it receives a respective, assigned private key paired with the one group public key. The joining circuit 124 may be configured to derive each respective private key to work with the established security parameters associated with the group and the issued public group certificate.

Figure 4:
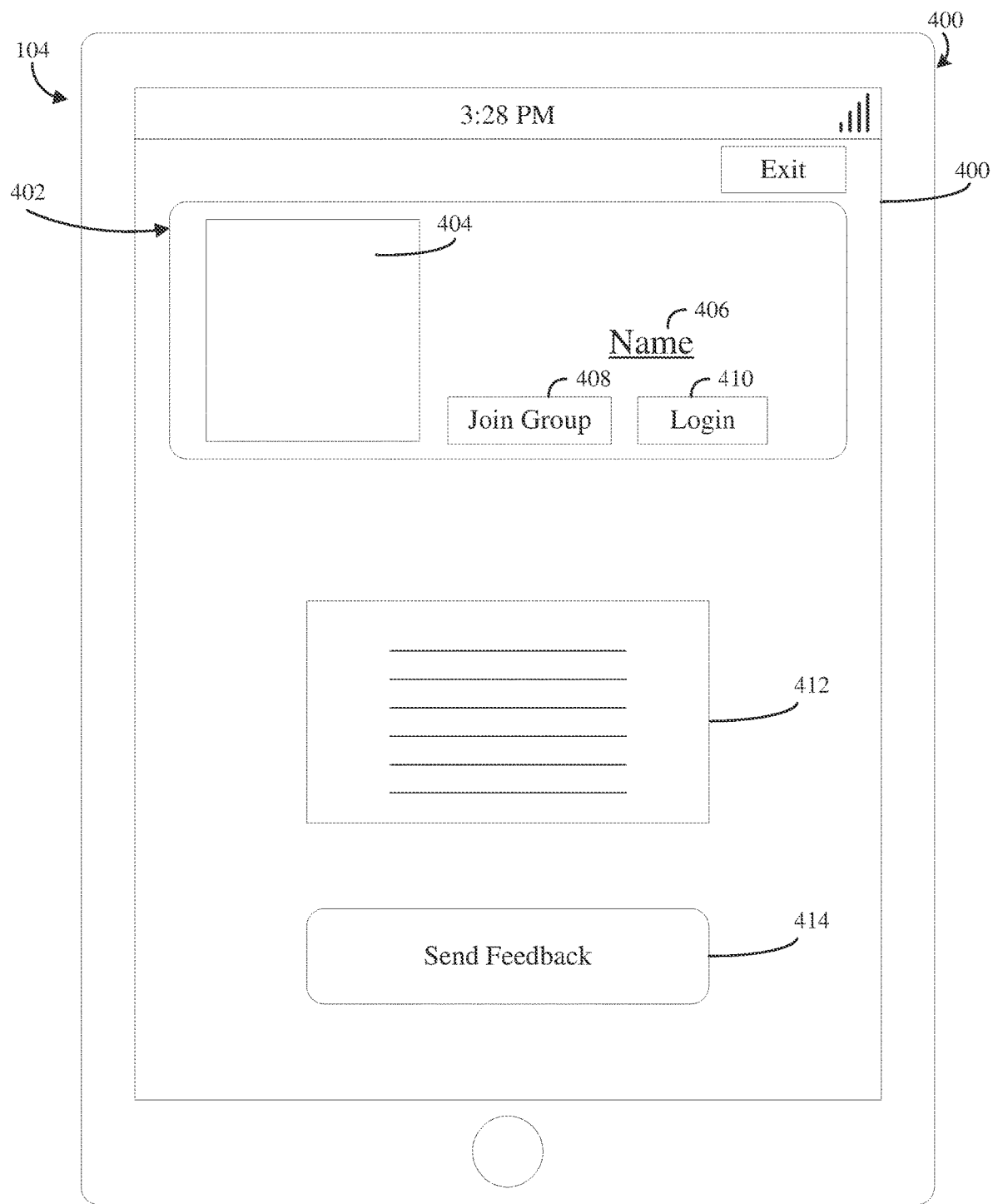
FIG. 4 is a schematic diagram of a graphical user interface for submitting feedback according to an example implementation.

The member computing system 104 may comprise a signing circuit 126. In some implementations, the signing circuit 126 is configured to digitally sign data using the private key of a group member associated with the respective member computing system 104. The signing circuit 126 may also be configured to send a request for a digital certificate associated with the private key of the group member. In some implementations, a user may access signing circuit 126 through a graphical user interface on the member computing system 104 (e.g., a graphical user interface as illustrated in FIG. 4).

The member computing system 104 may comprise a revocation circuit 128. In some implementations, the revocation circuit 128 is configured to revoke the ability of the user to sign using their private key associated with the group public key. In some implementations, a user may access the revocation circuit 128 through a graphical user interface on the member computing system 104 (e.g., a graphical user interface as illustrated in FIG. 4). In some implementations, a user (e.g., using a graphical user interface 400) may ask to be revoked. In some implementations, an administrator may instead ask for a user to be revoked. The user may be fully revoked such that all signed data by the user is no longer verifiable or partially revoked such that data signed by the user going forward is no longer verifiable.

The certificate authority system 106 includes a network interface circuit 132 and a certificate circuit 134. The certificate authority system 106 may, for example, include one or more servers each with one or more processors configured to execute instructions stored in a memory, send and receive data stored in the memory, and perform other operations to implement the services described herein associated with the processing modules, databases, and processes. In some implementations, the certificate authority system 106 is configured to issue digital certificates. In one example, a digital certificate may certify the ownership of a public key by the named subject of the certificate. In some implementations, the format of these certificates may be specified by the X.509 standard. The network interface circuit 132 is configured to facilitate operative communication between the certificate authority system 106 and other systems and devices over the network 110. underlying signing mechanisms are based on cryptographic techniques that can be automated. A ring signature may be created through the use of a public and private key pair with one or more other acquired public keys (without need of the corresponding private keys). A message or other data block is signed with the private key and all the public keys to create a ring signature. The message may be sent along with all of the public keys. The message recipient may look at the public keys included and used them to verify the signature on the received message without gaining knowledge of the actual signer identity.

Figure 2:
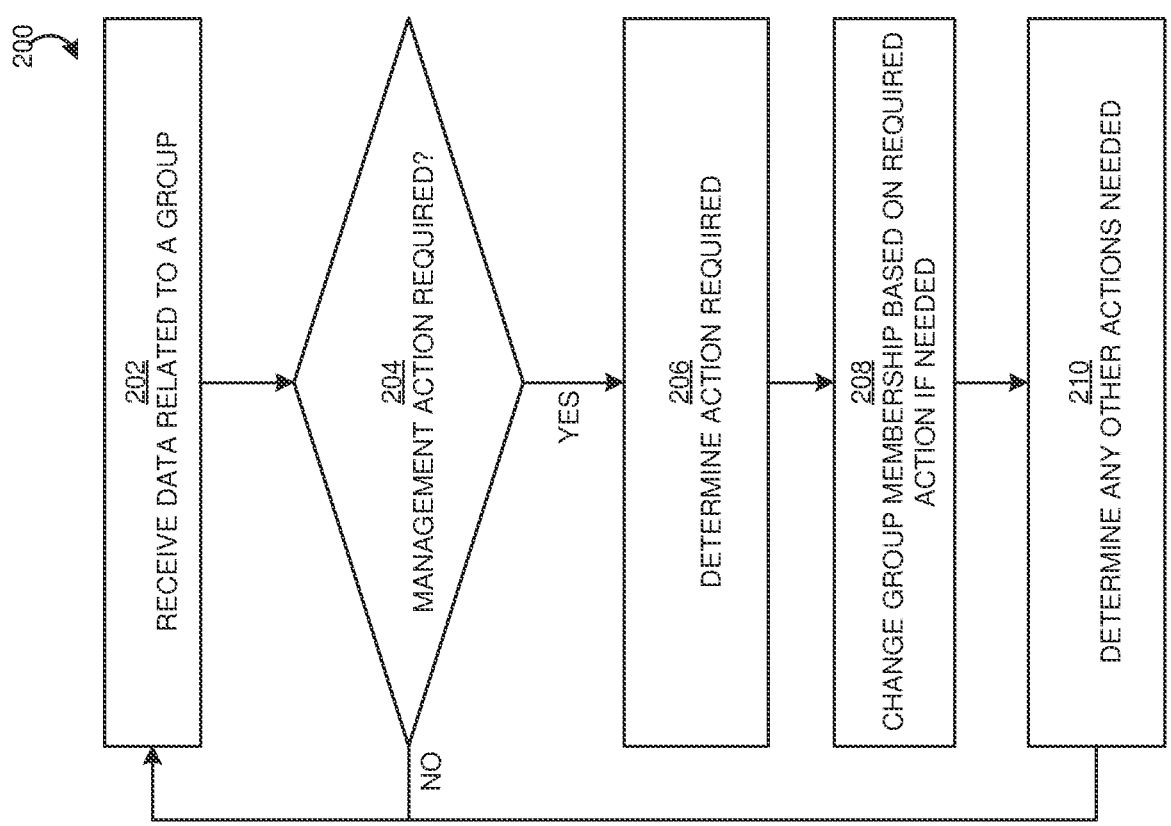
FIG. 2 is a flow diagram of a method of managing an action associated with group membership according to an example implementation.

Referring to FIG. 2, a flow diagram of a method 200 of managing an action associated with group membership is shown according to an example implementation. In some implementations, the method 200 is executed using an anonymous feedback system 102 (e.g., a key generation circuit 114 and/or membership circuit 115 of an anonymous feedback system 102). In brief, method 200 comprises receiving data related to a group and determining if management action is required. If management action is required, the action required is determined, a group member may be added as part of the required action, and a determination is made if any other actions are needed.

Still referring to FIG. 2 and in more detail, at 202, data related to a group is received. In some implementations, the data may be associated with one or more member of the group. The data may be associated with a request to remove a member or add a member to the group. The data may be a request to add an individual to a group associated with a previously generated group public key. The data may also be accompanied by additional data providing support for evidence that the individual should be considered to be a member of the group they are being added to. The data may instead be a request to revoke group membership of one or more members of the group or to revoke membership of all members of the group and/or dissolve the group. In some implementations, the data related to the group may be information related to a member of a group no longer being employed with a business, government, or other entity associated with the group. In some implementations, the data related to the group may be information related to improper, malicious, or unlawful activity related to one or more group members that may prompt further action by the group manager.

At 204, a determination is made if management action is required and what action is required at 206. In some implementations, a management action may be the addition of an individual to a group membership to be associated with a previously generated group key. In some implementations, a management action may be the revocation of group membership from a member of a group or a revocation of an available capability from a member of the group. The action required may be a creation or update of a blacklist or revocation list. In some implementations, the action required may be to revoke the entire group, revoke a single group member, or modify or remove specific signing capabilities of one or more members of the group. Where the action is being done by the Certificate Authority, the management action may be incorporated directly into a Digital Certificate validation or verification functionality of the Certificate Authority. Where the action is being done by a management system that is not the Certificate Authority (e.g., an anonymous feedback system 102), the action may comprise sending instructions or an update to a Certificate Authority. The instructions or update may be signed or comprise other verification of the authority of the sender to make the requested changes.

At 208, a group membership may be changed based on the required action if needed. In some implementations, one or more group members may be added based on the determination of what action is required. In some implementations, the addition of an individual to a group membership to be associated with a previously generated group key. In some implementations, revocation of membership is done by a verifier blacklist. For example, in a verifier blacklist implementation, a verifier (i.e., a Certificate Authority) may generate a blacklist where the linking tag of any revoked members is checked against future signatures. In some implementations, if the check fails a value of '0' is outputted (i.e., revoked) and validates if a value of '1' is outputted. In some implementations, the blacklist or an update to the blacklist is transmitted to one or more Certificate Authorities that generate and/or verify digital certificates with the group certificate extension. In some implementations, the group manager may function as the Certificate Authority. Up to three levels of revocation may be performed, for example, the entire group may be revoked, a single group member may be revoked, or specific signing capabilities of one member may be revoked. In some implementations, a user (e.g., using a graphical user interface 400) may ask to be revoked. In some implementations, an administrator may instead ask for a user to be revoked.

At 210, a determination is made if any other actions are needed. In some implementations, addition of a group member or a revocation action may lead to other actions that need to be executed. Other actions may include, transmitting a notification to the group member that the group member has been added to the group or that a revocation of group membership has occurred. In some implementations, the initiation of generating a private key associated with the relevant group public key may commence as described above. In the event of a revocation of group membership, the notification may include details on why there is a revocation and/or what the group member would have to do to rejoin the group and/or regain functionality that was removed.

Figure 3:
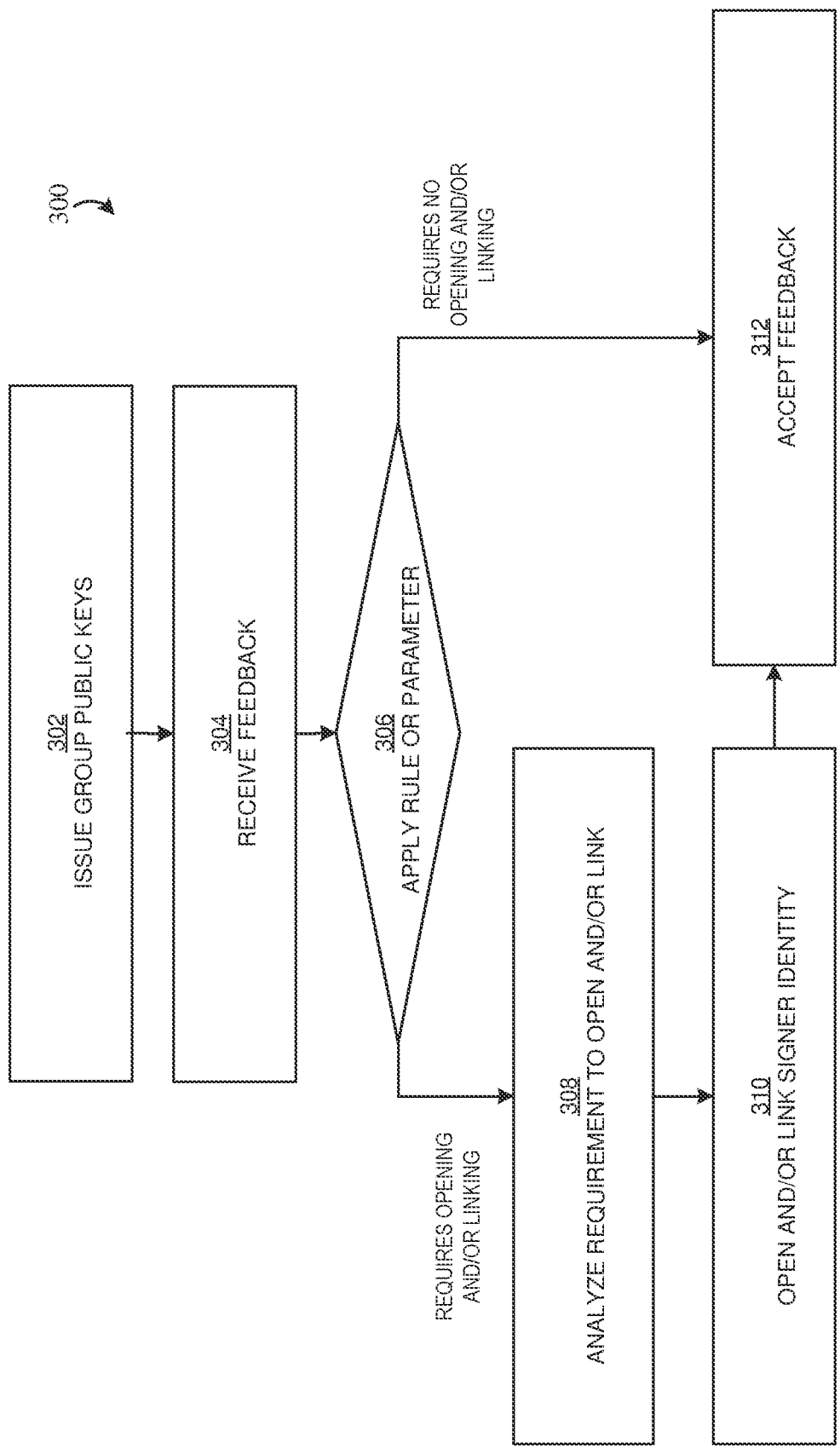
FIG. 3 is a flow diagram of a method of managing receiving feedback according to an example implementation.

Referring to FIG. 3, a flow diagram of a method 300 of managing receiving feedback according to an example implementation. The method 300 may be described in connection with receiving data at least partially comprising feedback and determining whether to transmit the feedback. In some implementations, method 300 is executed using a group manager system 102 (e.g., a key generation circuit 114, a membership circuit 115, an opener circuit 116, and/or a linking base circuit 118). In brief, method 300 comprises issuing a group public keys. If feedback associated with one of the group public keys is received, a determination is made whether application of a rule and/or parameter requires either opening or linking of an identity of the sender of the feedback. If application of the rule and/or parameter requires opening and/or linking, the requirement to open and/or link is analyzed and the opening and/or linking is performed before any acceptance of the feedback. If application of the rule and/or parameter is not required, than the feedback is accepted.

The method 300 begins at 302 with issuing group public keys. In some implementations, a group manager is responsible for generating public and private keys for various groups within an organization. For example, a group has a plurality of members and is managed by the group manager, with the adding of group members managed by the group manager. In some implementations, an associated group public key certificate is requested from a Certificate Authority by a group manager. For example, a group has a plurality of members and a single manager, all associated with a single signature verification key. A trusted authority (e.g., a Certificate Authority) establishes the group with a public digital certificate associated with the group public key with each group member having their own signing private key with which digital signatures that can be verified using the group public key. The group manager may be able to open a signature associated with any group signature by showing which group member signed the associated signature or linking two signatures by associating it with the same group member without necessarily revealing the identity of the same group member. In some implementations, a group manager when creating the group sets some security parameters (e.g., ISO, IC2008 standard group signature parameters). Once security parameters are set the group may be set up through the issuance of a public key for the group and a public digital certificate associated with the public key through a request to a Certificate Authority or self-issuance. Each member of the group may be enrolled by deriving their respective private key. The creation of each respective private key may be an iterative process with where each private key is created to work with the already generated group public key. The end result is each group member ends up with their own assigned private key paired with the one public key. Each respective private key is derived to work with the established security parameters and the issued public group certificate. The issued public group certificate is issued with an extension (e.g., a group signature extension). The group certificate extension may analyzed (e.g., by an auditing computing system 106) to identify a value associated with the extension identifying the group manager. The group certificate extension may be designated as non-critical. For example, a certificate authority may validate a digital certificate without checking for the extension and/or any data values associated with the extension. In some implementations, the group manager is identified by a uniform resource identifier (URI) that allows for a determination of who is operating the group allowing for a request to be sent to open a signature associated with one of the group signatures or link two or more signatures potentially associated with one of the group signatures. In some implementations, the certificate extension allows for a regulator with appropriate authority to contact the group manager for opening or linking functionality. The certificate extension is discussed in more detail in application Ser. No. 16/429,629 which is incorporated herein in its entirety by reference. In some implementations where the group manager and the Certificate Authority are the same entity, the group manager may perform a revocation of membership for a member of the group, wherein the Certificate Authority is able to check the signature against a revocation list. In some implementations, the group manager may provide the information necessary to the Certificate Authority to check the signature against a revocation list or blacklist. A secure channel may have to be initiated between the group manager and each group member to maintain a secure, managed group.

In one implementation, creating a functional linkable group signature comprises (1) key generation, (2) signing, (3) verification, (4) linking, and (5) revocation. The first part (1) of a group manager creating a group signature may comprise key generation. The group manager creates the group public parameters. The group manager executes an issuing process which is executed between the group manager and each group member to create a unique signature key with a private key and a group membership certificate for each group member. In some implementations, the group manager chooses the group public parameters and random generators. Adding a member is an iterative process where the group manager does not know the final result, private key created for the member but the group manager chooses a random prime number and computes a value that the member can check against. The second part (2) of a group manager creating a group signature may comprise the ability of a group member to sign by taking as an input the group member signature key, a linking base, and the data to be signed and outputting a linkable signature. The third part (3) may comprise verification comprising taking a message, a linkable signature, and the group private key corresponding to the group. In some implementations, a value of '1' is returned if the signature is valid and a value of '0' if the signature is not valid. The fourth part (4) may comprise a linking process that is able to take two valid, linkable signatures and determine if they are linked. In other words, that they have been signed by the same member of the group. In some implementations, linking outputs a value of '1' if the signatures are linked and a value of '0' if the signatures are not linked. The fifth part (5) may comprise a revocation part. In some implementations a private key revocation is implemented. In some implementations, a verifier blacklist is implemented. For example, in a verifier blacklist implementation, a verifier (i.e., a Certificate Authority) may generate a blacklist where the linking tag of any revoked members is checked against future signatures. In some implementations, if the check fails a value of '0' is outputted (i.e., revoked) and validates if a value of '1' is outputted.

At 304, feedback is received and a determination made whether the feedback is properly formatted and signed. The feedback may be signed with a private signature and accompanied by a digital certificate indicating membership in a group. The feedback may be signed with a private key creating a private signature and sent with a public key allowing for verification that the signer belongs to a group. The feedback may also be accompanied by information regarding which group the sender belongs to. In some implementations, receiving feedback may include verifying that the signature associated with the feedback matches the information regarding which group the sender belongs to. In some implementations, receiving feedback may include verifying a digital certificate associated with the signature. For example, the signature associated with the feedback may be verified to belong to a group that comprises executives of a company. In another example, the signature associated with the feedback may be verified to belong to a group that comprises a board of directors of a company. In another example, the signature may be verified to belong to a group that comprises a particular government committee member in a larger governmental body.

At 306, a determination is made if any rules or parameters should be applied to the received feedback. In some implementations, the rules or parameters to be applied, if any, are determined by the group associated with the group signature used to sign the feedback. In some implementations, application of the rules or parameters may require opening the identity of the signer of the feedback. In some implementations, application of the rules or parameters may require linking the signed feedback with other received signed feedback. For example, the group manager may be a trusted entity with the capability of opening and/or linking the signed feedback in order to apply any relevant rules or parameters. In one non-limiting example of a rule or parameter to be applied, there may be a rule limiting the quantity of feedback to be sent during a given time period. A parameter of the quantity of feedback to be permitted is set and the rule applies that parameter to the number of feedback receipts of an individual member of a group. Application of the rules or parameters may not require opening the identity of the sender of the feedback, but instead require linking the received feedback to other received feedback to determine whether the parameter has been met. In another example of a rule or parameter to be applied, there may be a time period and/or time limit set for receiving feedback from particular group members. Application of the rules or parameters to limit feedback to a pre-determined time period or for a pre-determined time limit would not require either opening the identity of the signer or linking the signed feedback to other received feedback. In another example, the content of the feedback may be analyzed and the application of a rule or parameter is dependent on the content of the feedback. Certain formatting may be required for certain types of feedback and the feedback is not passed on if the formatting is incorrect. The certain formatting may be dependent on which group the signer is a member with different formatting requirements for different groups. Other implementations and combinations for applying rules and parameters are possible depending on which group the signer is a member of, information contained in the feedback, a requirement to open and/or link signer identity, and/or other factors associated with receiving the signed feedback signed with a group signature.

At 308, the signed feedback is analyzed if a determination is that application of the rules and/or parameters requires opening the received, signed feedback. In some implementations, the group manager must be a trusted party in order to be given the capability of opening the received, signed feedback. In some implementations, the group manager must be a trusted $3^{rd}$ party in order to be given the capability of opening the received, signed feedback and separate from any business or other organization using the anonymous feedback environment (e.g., anonymous feedback environment 100). In some implementations other conditions must first be met in order to open the received, signed feedback. Conditions may include, the feedback has been received by the appropriate anonymous feedback system (e.g., anonymous feedback system 102), the feedback has been correctly signed using a group signature, and/or the feedback meets any required formatting requirements. In some implementations, application of the rules and/or parameters stems from a received request to open an identity of the signer. In some implementations, application of the rules and/or parameters stems from a received request to link an identity of the signer. Requests may, in some circumstances come from regulators with appropriate authority to contact a group manager for opening or linking functionality. In some implementations, this breaks the anonymity or partial anonymity (i.e., where one knows that someone in a group signed data but not the particular person) of the transaction in appropriate circumstances. In some implementations, using linking functionality, partial anonymity is still preserved as the only information provided is that two or more signatures are linked without revealing the particular signer in the group.

At 310, the identity of a signer of the feedback is opened and/or linked. In some implementations, a group manager of the anonymous feedback environment (e.g., anonymous feedback environment 100) has the ability to open a signature signed by a group member by identifying the member of the group that signed the feedback. While signatures that are created by different group members are indistinguishable to a verifier of the digital signature, they are not indistinguishable to the group manager (e.g., a group manager using anonymous feedback system 102 and the opener circuit 116) who can disclose the identity of any member of the group. In some implementations, the group manager has a secret master key that can be used to extract the identity of the signing group member. This capability provides the property of signer traceability, in what is are sometimes referred to as 'traceable signatures.' No one that is without possession of the secret master key (e.g., a secret master key held by a group manager) should be able to determine which group member was the signer. This capability provides the property of signer anonymity, where the larger the size of the group, the more anonymity for each group member is provided. In some implementations, the individual signatures of the group members may be a type of traceable signature, where the signature of a single member of the group may be traced without opening signatures or revealing identities of any other member of the group. In some implementations, a group manager of the anonymous feedback environment (e.g., anonymous feedback environment 100) has the ability to link a signature signed by a group member to other received, signed feedback. While signatures that are created by different group members are indistinguishable to a verifier of the digital signature, they may be linked together by the group manager (e.g., a group manager using anonymous feedback system 102 and the linking base circuit 118) who can identify a plurality of feedback that is linked to the same member of a group without revealing the identity of the group member.

At 312, the feedback is accepted. In some implementations, accepting feedback means transmitting the feedback to the proper recipient. The feedback may be accompanied by the group the sender of the feedback is a member of. For example, in a business, the feedback may be accompanied by the information that the feedback is coming from an executive of the company or within a particular department of the company. In another example, the feedback may be accompanied by the information that the feedback is coming from a particular governmental committee. In a further example, the feedback may be accompanied by the information that the feedback is coming from an individual with a particular security clearance.

Referring now to FIG. 4, an interface 400 on a display of a member computing device (e.g., member computing device 104), including a graphical user interface for submitting feedback, is shown according to an example implementation. In some implementations, the interface 400 and/or any generated information and/or generated private or public key values or associated values affecting an appearance of the interface 400 is provided by an anonymous feedback system (e.g., a membership circuit 115 of an anonymous feedback system 102). The interface 400 may include information relating to various applications related to sending feedback. An identifying profile may be provided by the anonymous feedback system 102. A profile area 402 of the interface 400 includes information relating to the individual user, including a profile picture 404 and a user name 406. The profile picture 404 and user name 406 may be selected by the user. A user may be able to join and/or access a list of groups they are a member of by interacting with buttons 408 and 410 respectively. Various information related to group membership and current status may be displayed from within interface 400. In some implementations, a text area 412 may allow for entry of text associated with feedback to be sent. In some implementations one or more display areas may be present on the interface 400, on pop-up screens, or additional screens of interface 400 (not shown) and used to display any applicable information associated with logging in to a particular group membership, joining a group, generating an associated private key while joining a group, sending feedback, receiving confirmation of sent feedback, and the like. Other implementations of interface 400 for joining a group associated with a group signature, generating and sending feedback and receiving confirmation may contain similar features.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the implementations might include a general purpose computing computers in the form of a computer, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and arrangement of the implementations without departing from the scope of the present disclosure as expressed in the appended claims.

What is claimed:

1. A system comprising one or more processing circuits configured to:
   receive, anonymously from a sender, a first feedback, a second feedback, and a single group public key associated with the first feedback and the second feedback, wherein the first feedback and the second feedback are signed by the sender with a corresponding private key, and wherein the first feedback and the second feedback comprise a group signature and a digital certificate indicating group membership of the sender in a group;
   verify the group signature using the single group public key based at least in part on matching the group signature with the digital certificate associated with the first feedback and the second feedback;
   link, based on matching the group signature, the first feedback and the second feedback using a linking key without revealing an identity of the sender;
   responsive to the first feedback and the second feedback being linked, open the identity of the sender using a secret master key;
   responsive to opening the identity of the sender, apply a rule or a parameter to at least one of the first feedback or the second feedback, the rule or the parameter associated with the at least one of the first feedback or the second feedback and configured to restrict acceptance of the at least one of the first feedback or the second feedback;
   compare formatting of the at least one of the first feedback or the second feedback to a formatting requirement associated with the group, wherein the formatting is dependent on the group membership of the sender in the group; and
   responsive to the formatting of the at least one of the first feedback or the second feedback not meeting the formatting requirement, deny acceptance of the at least one of the first feedback or the second feedback.

2. The system of claim 1, wherein the rule or the parameter are dependent on contents of the first feedback.

3. The system of claim 1, wherein the rule or the parameter are determined by parameters associated with the group or a type of group associated with the group signature used to sign the first feedback.

4. The system of claim 1, wherein the one or more processing circuits are further configured to tag the digital certificate with at least one of the group membership or a status of the sender of the first feedback,
   wherein tagging the digital certificate comprises issuing the digital certificate, the digital certificate comprising an indicator of at least one of the group membership or the status of the sender of the first feedback.

5. The system of claim 1, wherein the one or more processing circuits are further configured to tag the digital certificate with at least one of the group membership or a status of the sender of the first feedback,
   wherein tagging the digital certificate comprises entering an indicator of the group membership or the status of the sender of the first feedback in a certificate extension of the digital certificate.

6. The system of claim 1, wherein the one or more processing circuits are further configured to determine, based on the group signature, at least one of the group membership or a status of the sender of the first feedback.

7. The system of claim 1, wherein the one or more processing circuits are further configured to, responsive to an analysis of the first feedback, determine whether a management action is needed,
   wherein the management action comprises an alteration of the group membership associated with the group signature.

8. A method comprising:
   receiving, by one or more processors anonymously from a sender, a first feedback, a second feedback, and a single group public key associated with the first feedback and the second feedback, wherein the first feedback and the second feedback are signed by the sender with a corresponding private key, and wherein the first feedback and the second feedback comprise a group signature and a digital certificate indicating group membership of the sender in a group;
   verifying the group signature using the single group public key based at least in part on matching the group signature with the digital certificate associated with the first feedback and the second feedback;
   linking, by the one or more processors based on matching the group signature, the first feedback and the second feedback using a linking key without revealing an identity of the sender;

responsive to the first feedback and the second feedback being linked, opening, by the one or more processors, the identity of the sender using a secret master key;

responsive to opening the identity of the sender, applying, by the one or more processors, a rule or a parameter to at least one of the first feedback or the second feedback, the rule or the parameter associated with the at least one of the first feedback or the second feedback and configured to restrict acceptance of the at least one of the first feedback or the second feedback;

comparing, by the one or more processors, formatting of the at least one of the first feedback or the second feedback to a formatting requirement associated with the group, wherein the formatting is dependent on the group membership of the sender in the group; and responsive to the formatting of the at least one of the first feedback or the second feedback not meeting the formatting requirement, denying, by the one or more processors, acceptance of the at least one of the first feedback or the second feedback.

9. The method of claim 8, wherein the rule or the parameter are dependent on contents of the first feedback.

10. The method of claim 8, wherein the rule or the parameter are determined by parameters associated with the group or a type of group associated with the group signature used to sign the first feedback.

11. The method of claim 8, further comprising tagging the digital certificate with at least one of the group membership or a status of the sender of the first feedback,
wherein tagging the digital certificate comprises issuing the digital certificate, the digital certificate comprising an indicator of at least one of the group membership or the status of the sender of the first feedback.

12. The method of claim 8, further comprising tagging the digital certificate with at least one of the group membership or a status of the sender of the first feedback,
wherein tagging the digital certificate comprises entering an indicator of the group membership or the status of the sender of the first feedback in a certificate extension of the digital certificate.

13. The method of claim 8, further comprising determining, based on the group signature, at least one of the group membership or a status of the sender of the first feedback.

14. The method of claim 8, further comprising, responsive to an analysis of the first feedback, determining whether a management action is needed,
wherein the management action comprises an alteration of the group membership associated with the group signature.

15. A non-transitory computer-readable storage media storing instructions that are executable by one or more processors to perform operations comprising:
receiving, by the one or more processors anonymously from a sender, a first feedback, a second feedback, and a single group public key associated with the first feedback and the second feedback, wherein the first feedback and the second feedback are signed by the sender with a corresponding private key, and wherein the first feedback and the second feedback comprise a group signature and a digital certificate indicating group membership of the sender in a group;

verifying the group signature using the single group public key based at least in part on matching the group signature with the digital certificate associated with the first feedback and the second feedback;

linking, by the one or more processors based on matching the group signature, the first feedback and the second feedback using a linking key without revealing an identity of the sender;

responsive to the first feedback and the second feedback being linked, opening, by the one or more processors, the identity of the sender using a secret master key;

responsive to opening the identity of the sender, applying, by the one or more processors, a rule or a parameter to at least one of the first feedback or the second feedback, the rule or the parameter associated with the at least one of the first feedback or the second feedback and configured to restrict acceptance of the at least one of the first feedback or the second feedback;

comparing, by the one or more processors, formatting of the at least one of the first feedback or the second feedback to a formatting requirement associated with the group, wherein the formatting is dependent on the group membership of the sender in the group; and responsive to the formatting of the at least one of the first feedback or the second feedback not meeting the formatting requirement, denying, by the one or more processors, acceptance of the at least one of the first feedback or the second feedback.

16. The non-transitory computer-readable storage media of claim 15, wherein the rule or the parameter are dependent on contents of the first feedback.

17. The non-transitory computer-readable storage media of claim 15, wherein the rule or the parameter are determined by parameters associated with the group or a type of group associated with the group signature used to sign the first feedback.

18. The non-transitory computer-readable storage media of claim 15, the operations further comprising tagging the digital certificate with at least one of the group membership or a status of the sender of the first feedback,
wherein tagging the digital certificate comprises issuing the digital certificate, the digital certificate comprising an indicator of at least one of the group membership or the status of the sender of the first feedback.

19. The non-transitory computer-readable storage media of claim 15, the operations further comprising tagging the digital certificate with at least one of the group membership or a status of the sender of the first feedback,
wherein tagging the digital certificate comprises entering an indicator of the group membership or the status of the sender of the first feedback in a certificate extension of the digital certificate.

20. The non-transitory computer-readable storage media of claim 15, the operations further comprising determining, based on the group signature, at least one of the group membership or a status of the sender of the first feedback.

* * * * *